March 25, 1969  J. P. BEZERIE  3,435,235
MEANS FOR REDUCING INTERFERENCE EFFECTS IN
ELECTRO-OPTICAL DIRECTION FINDERS
Filed July 25, 1966

INVENTOR
Jean Pierre
  Bezerie
By  A. Sleek
       Attorney

March 25, 1969     J. P. BEZERIE     3,435,235
MEANS FOR REDUCING INTERFERENCE EFFECTS IN
ELECTRO-OPTICAL DIRECTION FINDERS
Filed July 25, 1966
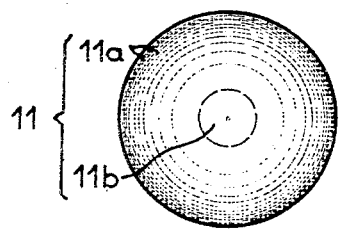
FIG. 3
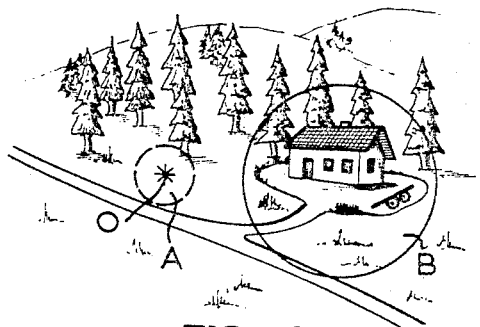
FIG. 4
FIG. 6
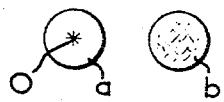
FIG. 5
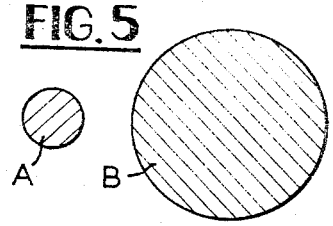
FIG. 7
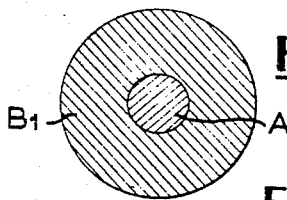
FIG. 9
FIG. 8
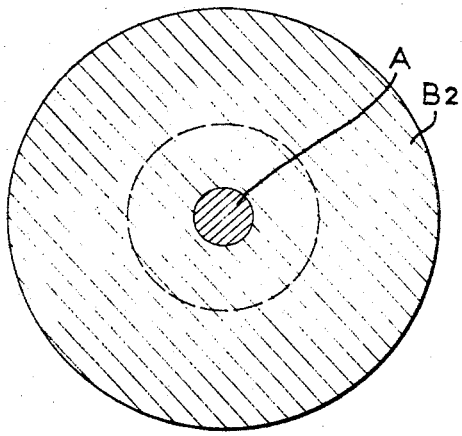
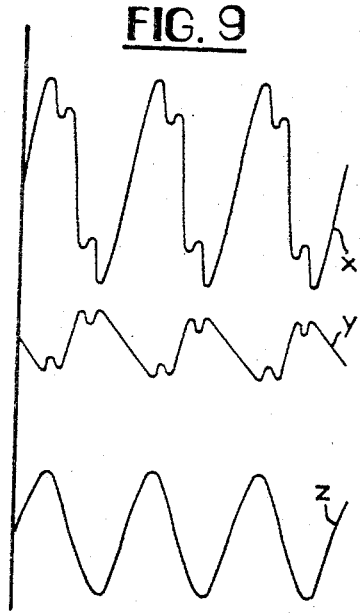
INVENTOR
Jean Pierre
Bezerie
By A. S. Seek
Attorney

# United States Patent Office 3,435,235
Patented Mar. 25, 1969

3,435,235
MEANS FOR REDUCING INTERFERENCE EFFECTS ON ELECTRO-OPTICAL DIRECTION FINDERS
Jean Pierre Bezerie, Villa d'Avary, France, assignor to Societe Anonyme de Telecommunications, Paris, France, a company of France
Filed July 25, 1966, Ser. No. 567,591
Claims priority, application France, Aug. 6, 1965, 27,525
Int. Cl. H01j 39/12
U.S. Cl. 250—209
8 Claims

ABSTRACT OF THE DISCLOSURE

Two separate optical systems are used to produce two distinct signals representative of the target, these signals being combined in a differential amplifier to effect a reduction of background interference.

---

The present invention relates to electro-optical direction finders. More particularly it relates to improvements in electro-optical direction finders operating by frequency modulation.

Direction finders of this type comprise an objective system, on the output side of which is an analyser arrangement formed from a photo-electric cell (sensitive to the part of the spectrum of interest to the user) before which is placed a modulator located in the image plane, which consists of a plane support having, starting from a central point, alternate transparent and opaque radial zones and which describes, whilst remaining parallel to itself in its plane, a circular translatory movement appreciably co-axial with the optical axis of the objective system, to modulate the image of an object (which is a radiant source, that is to say a source of radiations) occurring in the angle of field of the aforesaid objective system, so that the cell emits pulse signals which are transmitted to a control circuit and used to determine the position of the subject or object (radiant source), with respect to the aforesaid optical axis, and possibly to operate deflector means interposed in the path of the radiations, for example light rays, transmitted by the objective system with a view to maintaining the centering of the image in the analysing zone of the apparatus.

The use of direction finders of this type has brought out the existence of modulated interference signals, of unknown phase and generated by the image of the zone surrounding the object viewed, that is to say the image of the "landscape" contained in the field angle of the aforesaid objective.

It is an object of the present invention to reduce the aforesaid interfering signals which are manifested by an increase in the accuracy and range of this type of direction finder.

According to the invention, there is provided an electro-optical direction finder, with frequency-modulation detector, of the type comprising an objective system on the output side of which is an analyser arrangement formed by a photo-electric cell sensitive to the part of the spectrum of interest to the user, in front of which is placed a modulator which is arranged in the image plane, which consists of a plane support having, starting from a central point, alternative transparent and opaque radial zones and which describes, whilst remaining parallel to itself in its plane, a circular translatory movement substantially co-axial with the optical axis of the objective system, to modulate the image of an object constituting a radiant source occurring in the field angle of the aforesaid objective system, so that the cell emits pulse signals transmitted to an electronic control circuit and used to determine the position of the object with respect to the aforesaid optical axis, and if necessary to activate deflector means interposed in the path of the light rays transmitted by the objective system with a view to maintaining the centering of the image in the analysis zone of the apparatus, wherein the optical part, called "principal optical part," of the direction finder is provided with a graduated optical filter located in the immediate proximity of the focal plane of the objective and has a periphery of maximal opacity and a central zone of minimal opacity centered exactly on the analysis field, so that the image of the object viewed is in a fully lit field and provides "object" signals as well as well-defined "interference" signals corresponding to said fully lit field, signals of which the frequency is the central frequency (unmodulated) of analysis and of which the phase is defined, whilst there is associated, with the aforesaid principal optical part, an auxiliary compensating optical system having an objective which projects an image of the "landscape" associated with the aforesaid object, on an auxiliary modulator identical with modulator which cooperates with the principal optical part, moving in synchronism and in phase with it and behind which is an auxiliary photo-electric cell providing thus well-defined "landscape" signals, connected to one of the two inputs of a differential amplifier of which the other input is connected to the principal photo-electric cell (that is to say that which is affected by the principal optical part), in such manner that the "landscape" signals can, in the differential amplifier counteract the "interference" signals accompanying the useful "object" signals so that the amplifier delivers substantially only "object" signals cleared of interference signals.

In preferred embodiments, according to the invention the following additional features are included either separately or in combination:

The graduated optical filter is circular;

The central part of the filter, that having the maximal transparency, is open so that this transparency is 100%;

The auxiliary modulator is provided on the same support as the modulator of the principal optical part;

The field angle of the auxiliary compensating optical system is greater than the field angle of the principal optical system;

The two optical systems are arranged so that the area of the "object" image falling on the principal modulator, after having been outlined by the graduated filter, is appreciably equal to the area of the "landscape" image falling on the auxiliary modulator;

A condenser is interposed in the path of the light rays, between the objective of the auxiliary optical system and the auxiliary modulator, and the objective is arranged so that its image plane falls on the said condenser;

In a case where the auxiliary optical system is arranged to pick up a "landscape" zone surrounding the "object" zone, a screen is placed in the auxiliary optical system (advantageously on the input side of the condenser) to obscure the rays corresponding to the object;

The auxiliary optical system may be arranged to embrace a "landscape" zone not containing the object, or an annular landscape zone of small dimensions surrounding the object, or a landscape zone greater than that corresponding to the field angle defined by the graduated filter and the principal objective;

Phasing means (e.g. mechanical, optical or electrical) of any suitable type are provided to obtain perfect phase opposition, with a view to obtaining interference-free signals.

Other features and characteristics of the invention will emerge from the following description.

In order that the invention may be more fully understood an example of an embodiment of an improved frequency-modulated electro-optical direction finder according to the present invention is described below, purely by way of non-limiting illustration wtih reference to the accompanying drawings in which:

FIGURE 3 shows a view in elevation of the graduated filter;

FIGURE 4 shows a view in elevation of an object group with the landscape which surrounds it and showing the zones embraced respectively by the field angles of the two optical systems;

FIGURE 5 shows schematically the position of the zones embraced in the case of FIGURE 4;

FIGURE 6 shows the "object" image circumscribed by the central transparent zone of the graduated filter, on one hand, and the "landscape" image, of the same area as the preceding one, concentrated by the condenser of the auxiliary compensating optical system, on the other hand;

FIGURE 7 shows schematically zones contained by the two optical systems, in the case where the "landscape" zone is an annular form, of small dimensions, surrounding the "object" zone;

FIGURE 8 shows schematically an arrangement analogous to the preceding one in a case where the "landscape" zone, concentric with the "object" zone has dimensions greater than those of the total field defined by the graduated filter and the objective of the principal optical system;

FIGURE 9, shows a diagram representing respectively, by $x$, useful signals associated with interference signals, by $y$, landscape signals dephased by one half-cycle with respect to the preceding ones, and by $z$, useful signals cleared of interfering signals.

Figure 1:
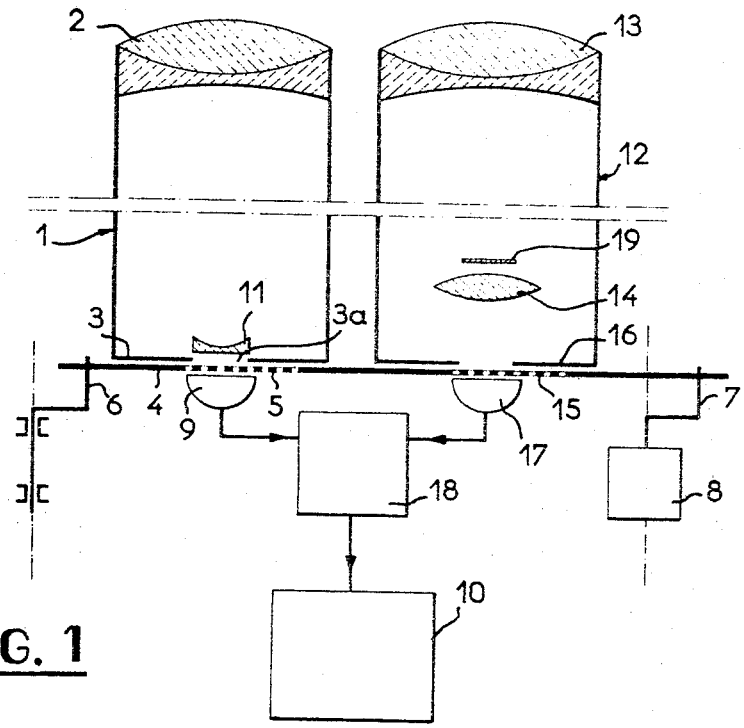
FIGURE 1 shows a simplified schematic view of the direction finder.

Referring now to the drawings in FIG. 1, there is designated by 1 the principal optical part comprising the objective system 2 and diaphragm 3.

Behind the diaphragm 3 and in the image plane of the objective system 2, is the moveable support 4 of the modulator 5 (which will be designated below under the name of principal modulator), which support 4 is mounted on two cranks 6 and 7 having arms of the same length, the second being mounted on the shaft of a motor 8.

On the output side of the modulator 5 and substantially on the optical axis of the objective system 2, is the photo-electric cell 9 whose signals are transmitted to the circuit 10.

For simplicity in the drawing, the details of the electronic circuit 10 are not shown, nor the deflector means for centering the image, nor the deflector means for searching (if used), nor the connection between the motor means 8 and the aforesaid electronic circuit. Similarly, the functioning of this type of deflector is not explained in detail in the present description.

The structural and functional characteristics of this type of direction finder are now well known and it will suffice to refer to the literature regarding these aspects of the equipment.

Experience has shown that with a direction finder of this type, the useful signals, corresponding to the object O (which is a radiating source) on which is oriented the optical part of the apparatus, are accompanied by interfering signals corresponding to the landscape zone B which surrounds the aforesaid object or which is in the neighbourhood of this object, the phase of these interfering signals being unknown.

The ratio useful signal/interfering signal clearly limits the range and the accuracy of the direction finder and it is an object of the present invention to minimise the interfering signal so as to increase this range and this accuracy.

According to the invention, the field angle (fully-lit field) $\alpha$ of objective 2 is delineated by placing in immediate proximity to the focal plane of the objective, for example before the image plane, in which is the modulator 5, a graduated optical filter 11 substantially masking the aperture 3a of diaphragm 3, which filter 11 has (see FIG. 3) a periphery 11a of maximal opacity to the radiation issuing from the object viewed and a central zone 11b of minimal opacity, the variation curve of the opacity being of any form, for example, a straight line. The maximal transparency (100%) of the central zone 11b is advantageously obtained by constituting this zone by a hole traversing the filter.

This arrangement already eliminates partially the interfering signals of the landscape, this in a degree the more effective as the points of the landscape are more removed from the object (radiating source) O, that is to say the points which, in the image plane, correspond to the most absorbent part of the graduated filter 11.

Nevertheless the residual interfering signals corresponding to the points of the landscape nearer the principal subject are collected, but these residual signals are now well defined, as far as their phase is concerned, by the fully-lit field (very small with respect to the total field of analysis) outlined by the graduated filter. In fact, this filter acts as a frequency filter in the sense that it limits the frequency modulation, generated by the interference, to a band so narrow that it practically no longer occurs except in the presence of the base frequency (exempt of modulation) of the direction finder.

To eliminate them, it suffices to counteract them, dephased by 180°, by compensating signals and it is to this end that, according to the invention, there is associated with the path 1 of the direction finder, provided with the graduated filter 11, an auxiliary compensating optical part 12 comprising an objective 13 and a condenser 14 which project, on to an auxiliary modulator 15 carried by the same support 4 as the modulator 5 and placed behind a diaphragm 16, the image of the landscape zone B associated with the object O.

Behind the auxiliary modulator 15 is an auxiliary photo-electric cell 17. The two photo-electric cells 9 and 17 are connected to two inputs of a differential amplifier 18 of which the output is connected to the electronic circuit 10.

The objective systems 2, on one hand, and 13–14, on the other hand, are arranged to have, first, a field angle $\alpha$ (corresponding to the central transparent part 11b of the graduated filter 11) limited to the object (radiant source) O and, second, a field angle $n\alpha$ greater than $\alpha$ ($n$ being greater than 1) and so that the images $a$ and $b$ projected respectively on the modulators 5 and 15 have substantially the same area (see FIGURE 6).

Under these conditions, the analysis is not the same for the two optical paths 1 and 12;

For the optical path 1, the modulator modulates directly the rays corresponding to a small part of the field image defined by the central part 11b of the filter 11;

For optical path 12, the modulator 15 modulates the rays corresponding to an image $b$ of the same size as the preceding one $a$ and which is the result of the concentration, on the said modulator, of all the rays contained in the angle $n\alpha$ of the object 13.

This angle $n\alpha$ may be modified for adaptation to each case, this whilst varying the characteristics of the optical system (focal, diameter of condenser 14, etc. . . .).

At the input of the differential amplifier connected to cell 9 arrive signals (useful and interference) represented by $x$ in FIGURE 9. At the other input, connected to cell 17, arrive compensating signals $y$ with a phase-shift of 180° relative to the aforementioned interference signals.

At the output of this amplifier then appear only useful signals $z$, substantially cleared of interference signals.

Several cases may be considered with regard to the landscape zone (or compensation zone) embraced by the optical system 13–14 of the optical part 12.

In a first case, the compensation zone B is constituted by a part of the landscape in the neighbourhood of the subject appearing in zone A. This is the case which is shown in FIGURES 4 and 5, a case in which there is obtained, in the image planes of the two optical systems, images a and b (of the same area) of FIGURE 6.

In the second case (FIGURE 7), the compensating zone in an annular part B1, of relatively reduced dimensions, surrounding the zone A.

Figure 2:
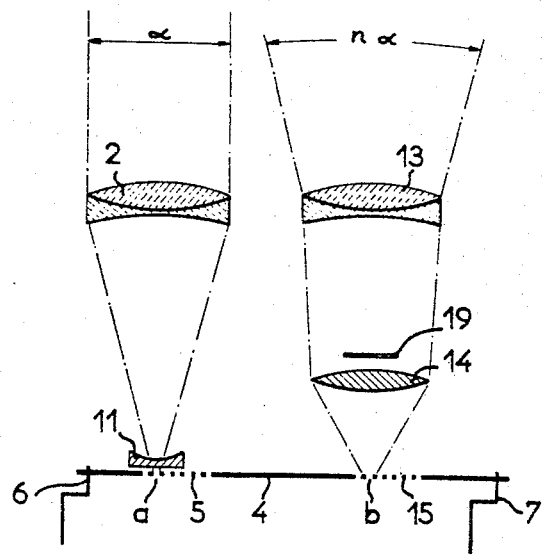
FIGURE 2 shows the two optical systems of the apparatus, with their respective field angles.

In this particular case, there is provided, on the input side of the condenser 14, a screen 19 (FIGURE 2) intended to mask the zone A in which the object occurs.

In a third case (FIGURE 8), the compensating zone B2 is part of the landscape of a greater dimension than those corresponding to the total field defined by graduated filter 11 and the objective 2.

To obtain perfect phase opposition between the interference signals and the signals from interference alone, the arrangement comprises additionally phasing means of any suitable type, mechanical, or optical, or even electronic, and well known in the art.

It is evident that the embodiment of the improved direction finder according to the invention, given as example described above and shown in the accompanying drawing, has only been given by way of an indication and that it may be subject to all modifications of detail without parting, in this respect, from the spirit of the invention.

What I claim is:

1. A compensated electro-optical direction finder, comprising: a principal electro-optical direction finder with frequency modulation detection comprising an objective and an analyser arrangement located behind the objective and formed by a modulator located substantially in the image plane of the said objective and consisting of a plane support having, starting from a central point, alternately transparent and opaque radial zones, a photo-electric cell placed behind the modulator, drive means to support the modulator and to make it describe before said cell, a circular movement of translation such that the central point of the modulator describes a substantially coaxial circumference around the optical axis of the objective, to modulate the image of a viewed object within the field angle of the aforesaid objective and to make said cell emit pulse signals of which the frequency is modulated as a function of the position of the object with respect to the optical axis, a graduated optical filter located, substantially on the optical axis of the objective, in proximity to the focal plane of this objective and having, on one hand, a periphery of maximal opacity and, on the other hand, a central zone of minimal opacity centered on the said optical axis, so that the image of the viewed object appears in a fully lit field and provides "object" signals and "interference" signals; an auxiliary frequency modulation electro-optical direction finder comprising an objective and an analyser arrangement analogous to those of the principal direction finder and having its modulator driven by the same said drive means as the principal direction finder so that the modulators of the two direction finders move in synchronism and in phase; a differential amplifier having two inputs and an output, said inputs being connected respectively to the photo-electric cells of the principal direction finder and of the auxiliary direction finder; whereby the output of the differential amplifier provides "object" signals substantially cleared of "interference" signals.

2. A direction finder according to claim 1, in which the graduated optical filter is circular.

3. A direction finder according to claim 1, in which the central part, of maximal transparency, of the filter, is pierced so that this transparency may be 100%.

4. A direction finder according to claim 1, in which the modulator of the auxiliary direction finder is on the same support as the modulator of the principal direction finder.

5. A direction finder according to claim 1, in which the field angle of the optical system of the auxiliary direction finder is greater than the field angle of the optical system of the principal direction finder.

6. A direction finder according to claim 1, in which the two objectives are arranged so that the area of the "object" image falling on the modulator of the principal direction finder, after having been limited by the graduated filter, is substantially equal to the area of the "landscape" image falling on the modulator of the auxiliary direction finder.

7. A direction finder according to claim 1, comprising in addition a condenser inserted in the part of the light rays, between the objective of said auxiliary direction finder and the modulator of said auxiliary direction finder, the objective of said auxiliary direction finder being arranged so that its image plane falls on said condenser.

8. A direction finder according to claim 7, in which said condenser is arranged to embrace a "landscape" zone surrounding the "object" zone, and the auxiliary direction finder comprises a screen located on the input side of the condenser to obscure the rays corresponding to the object.

References Cited

UNITED STATES PATENTS

| | | | |
|---|---|---|---|
| 2,905,828 | 9/1959 | O'Maley et al. | 250—203 |
| 3,174,045 | 3/1965 | Whitney et al. | 250—209 |
| 3,219,642 | 11/1965 | Killpatrick | 250—203 |

JAMES W. LAWRENCE, *Primary Examiner.*

F. R. LA ROCHE, *Assistant Examiner.*

U.S. Cl. X.R.

250—220